2,934,167

PURIFICATION OF BORON TRICHLORIDE

James Maxwell Hesselgesser, Dover, N.J., assignor, by mesne assignments, to Thiokol Chemical Corporation, a corporation of Delaware No Drawing. Application October 12, 1955
Serial No. 540,144

1 Claim. (Cl. 183—114.2)

This invention relates to an improved process for the purification of boron trichloride. More particularly, it relates to the removal of phosgene and chlorine from boron trichloride.

Boron trichloride ($BCl_3$) is a gas at ordinary temperatures, having a boiling point of about 13° C. It is prepared conveniently by chlorinating mixtures of boron oxide and carbon heated to elevated temperatures approximating 1000 to 1200° C. The chloridizing reaction results in the formation of boron trichloride and a relatively large volume of carbon monoxide in accordance with the equation:

$$B_2O_3 + 3C + 3Cl_2 = 2BCl_3 + 3CO$$

This reaction is exceedingly difficult to control and the effluent gases usually contain free chlorine and phosgene as well as boron trichloride and carbon monoxide. On condensing this mixture of gases at temperatures of about 0° C. or lower, the boron trichloride and the phosgene, which have closely similar boiling points, collect in the liquid phase and this liquid phase has a relatively high solubility for the free chlorine present in the gas mixture. The dissolved chlorine and phosgene are not readily removed by selective vaporization. The crude product is useful for some purposes but for others, the chlorine and phosgene interfere. Thus it is necessary to provide a method for the purification of crude boron trichloride, particularly with respect to chlorine and phosgene.

The process of the present invention comprises passing boron trichloride contaminated with phosgene and/or chlorine in contact with a zeolite at temperatures from −80° C. to 150° C. Suitable pressures employed in this process can be atmospheric, sub-atmospheric or super-atmospheric, depending on the desired flow rates. Ordinarily the process of the invention can conveniently be practiced at substantially atmospheric temperatures and pressures.

At temperatures below about 13° C. at atmospheric pressure, boron trichloride is a liquid. When the process of the present invention is applied to liquid boron trichloride, the liquid is suitably percolated through zeolites in granular form, for example, in a column. Alternatively, the finely divided zeolite can be stirred with the liquid until it is colorless and the zeolite can be removed then, suitably by filtration. It is usually more convenient to operate at substantially atmospheric pressure and temperature in which case gaseous boron trichloride is passed through a suitable bed or column of granular zeolite. Operating either in the liquid or vapor phase, substantially no boron trichloride is decomposed. The exit gas, however, at times contains more volatile contaminants, for example, hydrogen chloride. The effluent is advantageously liquefied in a suitable cold trap, for example, at −80° C., and any volatile contaminants are subsequently removed by pumping until the residual liquid has the vapor pressure of pure boron trichloride at the temperature at which it is maintained. At −80° C., this is 3.3 mm. of mercury.

Zeolites suitable for use in the process of the present invention can be natural or synthetic. Ordinarily they are activated by heating before use, suitably at temperatures of about 300 to 350° C. Such activation of the zeolites is well known in the art. The zeolites are characterized as sodium aluminosilicates or calcium aluminosilicates and can be considered as composed of soda, lime, alumina and silica as components. These clays occur naturally as greensand and in other forms. Synthetic zeolites have the same chemical components and are particularly uniform in crystalline structure. This crystalline structure, when dehydrated in the activation process, contains a large number of small cavities interconnected by still smaller holes or pores. This network of cavities and pores amounts to almost 50% of the total volume of the crystals. The pores are precisely uniform in size and allow only molecules having a smaller diameter to enter the cavities and be adsorbed. This permits separation of different molecular species based on molecular size.

When the zeolites are to be used for the vapor phase treatment of boron trichloride or for percolation of the liquid phase they are preferably used in granular form, for example, having particle sizes of about 1/32 to 1/8 inch in larger dimension. Whatever the particle size, it is advantageous for the zeolite to be screened and a fraction selected in which the individual particles are of uniform size. This avoids packing of undersized particles between larger particles and facilitates fluid flow through the bed. When the zeolites are to be used for contacting liquid boron trichloride, they are preferably used in more finely divided form and can have particle sizes, for example, of from 50 to 300 mesh (U.S. Standard sieves).

In continuous operation, a plurality of beds can be used, one being reactivated by heat while another is in use and alternating the flow between the beds. At the end of a cycle and before reactivating the bed, residual boron trichloride in the zeolite is advantageously recovered by evacuation and condensation. In batch operation, such evacuation and condensation to recover residual boron trichloride is carried out to complete the batch operation before reactivation of the zeolite.

It is an advantage of the process of the present invention that the method is effective for the purification of commercial quantities of boron trichloride. The starting materials and condition of operation allow easy handling of materials and simple design of apparatus. The zeolites are readily available at low cost.

*Example I*

A glass column about 1 inch in diameter by 5 feet long was packed with about 500 grams of synthetic calcium aluminosilicate zeolite having openings averaging about 5 Angstrom units in the form of pellets about 1/16 inch in diameter by 1/8 inch in length. The bed was activated by heating the column and contents in a tube furnace to a temperature of about 300–350° C. for about one hour under reduced pressure. After cooling, a vaporized sample of impure boron trichloride containing approximately 3% by volume of phosgene and 8% by volume of chlorine and having an intense yellow-green color was passed through the bed at room temperature. The gas was drawn through the bed by slightly reduced pressure and into a cold trap maintained at −196° C. The sample was warmed and a gaseous portion was removed for infrared spectrographic analysis. It showed that only boron trichloride was present and that hydrogen chloride and phosgene were absent. No chlorine was present in the product since it was completely clear and colorless. Recovery was substantially 100%.

*Inorganic exchangers.*—Commercial inorganic zeolites include the natural and synthetic aluminosilicate cation-exchanger gels. A considerable volume of treated glauconite (greensand), obtained from natural greensand marl, is used for commercial water softening. The greensand marl is mined from deposits of marine origin in southern New Jersey, washed, and heat treated. Other natural zeolites suitable for use in the process of this invention include analcite, $NaAlSi_2O_6 \cdot H_2O$; chabazite, $$CaAl_2Si_4O_{12} \cdot 6H_2O$$

thomsonite, $NaCa_2Al_5Si_5A_{20} \cdot 6H_2O$; natrolite, $$Na_2Al_2Si_3O_{10} \cdot 2H_2O$$

stillbite, $NaCa_2Al_5Si_{13}O_{36} \cdot 14H_2O$ and phillipsite, $$KCaAl_3Si_5O_{16} \cdot 6H_2O$$

In addition to these natural deposits, a large tonnage of synthetic aluminosilicate zeolites is produced annually for water softening. These synthetic inorganic silicates are prepared by the reaction of a solution of sodium silicate with various aluminum salts. The precipitated gel is filtered, washed, and carefully dried. The dried product is then crushed and screened to pass a 30-mesh screen. These synthetic zeolites are also useful in the process of the present invention.

I claim:

A method for the treatment of boron trichloride containing at least one of the materials chlorine and phosgene as an impurity to provide a boron trichloride product containing readily separable more volatile contaminants which comprises contacting the boron trichloride with a zeolite at a temperature of $-80°$ C. to $150°$ C. and recovering a boron trichloride product containing readily separable more volatile contaminants.

References Cited in the file of this patent

UNITED STATES PATENTS

| | | |
|---|---|---|
| 2,097,482 | Weber | Nov. 2, 1937 |
| 2,369,214 | Cooper | Feb. 13, 1945 |